United States Patent
Dittmer et al.

(10) Patent No.: US 11,215,272 B2
(45) Date of Patent: Jan. 4, 2022

(54) TRANSMISSION UNIT, IN PARTICULAR AN AXLE DRIVE OR TRANSFER CASE, HAVING A TRANSMISSION ELEMENT MOUNTED THEREIN VIA AT LEAST ONE DOUBLE-ROW ANGULAR CONTACT BALL BEARING

(71) Applicant: Schaeffler Technologies AG & Co. KG

(72) Inventors: Steffen Dittmer, Aurachtal (DE); Andreas Heinz, Nuremberg (DE); Wolfgang Schumacher, Dittelbrunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 49 days.

(21) Appl. No.: 16/618,416

(22) PCT Filed: May 17, 2018

(86) PCT No.: PCT/DE2018/100472
§ 371 (c)(1),
(2) Date: Dec. 2, 2019

(87) PCT Pub. No.: WO2018/224083
PCT Pub. Date: Dec. 13, 2018

(65) Prior Publication Data
US 2021/0140527 A1    May 13, 2021

(30) Foreign Application Priority Data
Jun. 6, 2017   (DE) .................... 10 2017 112 337.7

(51) Int. Cl.
*F16H 57/021*   (2012.01)
*F16C 19/18*   (2006.01)
(Continued)

(52) U.S. Cl.
CPC .......... *F16H 57/021* (2013.01); *F16C 19/182* (2013.01); *F16C 19/505* (2013.01); *F16H 2048/405* (2013.01); *F16H 2048/423* (2013.01)

(58) Field of Classification Search
CPC ...... F16C 19/182; F16C 19/505; F16C 19/56; F16H 2048/405; F16H 2048/423; F16H 57/021
See application file for complete search history.

(56) References Cited

U.S. PATENT DOCUMENTS

| 783,168 A | * | 2/1905 | Baker .................... F16H 48/08 475/244 |
| 8,668,391 B2 | | 3/2014 | Felis |

(Continued)

FOREIGN PATENT DOCUMENTS

| CN | 1882789 A | 12/2006 |
| CN | 102084142 A | 6/2011 |

(Continued)

OTHER PUBLICATIONS

International Search Report for Corresponding PCT/DE2018/100472.

*Primary Examiner* — Ernesto A Suarez
*Assistant Examiner* — James J Taylor, II
(74) *Attorney, Agent, or Firm* — Davidson, Davidson & Kappel, LLC (57) ABSTRACT

A transmission unit includes a transmission housing, a transmission element rotatably accommodated in the transmission housing, a bearing seat, and an angular contact ball bearing accommodated in the bearing seat, for mounting the transmission element, as well as a double-row angular contact ball bearing having: an inner bearing ring; an outer bearing ring; a first ball-cage assembly with first balls which are accommodated in a first track space extending between a first inner rolling element raceway of the inner bearing ring (Continued)

and a first outer rolling element raceway of the outer bearing ring; and a second ball-cage assembly with second balls which are accommodated in a second track space extending between a second inner rolling element track of the inner bearing ring and a second outer rolling element track of the outer bearing ring.

18 Claims, 7 Drawing Sheets

(51) Int. Cl.
  F16C 19/50 (2006.01)
  F16H 48/40 (2012.01)
  F16H 48/42 (2012.01)

(56) References Cited

U.S. PATENT DOCUMENTS

| 2007/0104404 | A1 | 5/2007 | Niebling et al. |
| 2011/0033149 | A1 | 2/2011 | Bohr et al. |
| 2012/0237151 | A1 | 9/2012 | Felis |
| 2013/0182986 | A1 | 7/2013 | Tanaka et al. |
| 2014/0140650 | A1 | 5/2014 | Labelle |
| 2015/0071579 | A1 | 3/2015 | Tate et al. |
| 2015/0123455 | A1 | 5/2015 | Olivieri et al. |

FOREIGN PATENT DOCUMENTS

| CN | 104632903 A | 5/2015 | |
| DE | 2449194 C2 | 4/1976 | |
| DE | 133842 A1 | 1/1979 | |
| DE | 10331936 A1 | 2/2005 | |
| DE | 102008024316 | 11/2009 | |
| DE | 102009057192 A1 | 6/2011 | |
| EP | 1105662 B1 | 6/2002 | |
| EP | 2503168 A1 | 9/2012 | |
| EP | 2733372 A2 | 5/2014 | |
| FR | 2888625 A1 | 1/2007 | |
| JP | 04168948 A * | 6/1992 | .............. F16C 19/56 |
| JP | 2003294032 A1 | 10/2003 | |
| JP | 2012102781 A | 5/2012 | |
| KR | 20010072965 A | 7/2001 | |
| WO | WO8503749 A1 | 8/1985 | |
| WO | WO2011062175 A1 | 5/2011 | |

\* cited by examiner

TRANSMISSION UNIT, IN PARTICULAR AN AXLE DRIVE OR TRANSFER CASE, HAVING A TRANSMISSION ELEMENT MOUNTED THEREIN VIA AT LEAST ONE DOUBLE-ROW ANGULAR CONTACT BALL BEARING

CROSS-REFERENCE TO RELATED APPLICATIONS

This application is a national phase application of PCT/DE2018/100472, filed May 17, 2018 and claims priority to DE 10 2017 112 337.7 filed Jun. 6, 2019, the entire disclosures of which are incorporated by reference herein.

The present disclosure relates to a transmission unit including a transmission housing, a transmission element rotatably accommodated in the transmission housing, a bearing seat, and an angular contact ball bearing accommodated in the bearing seat, for mounting the transmission element.

BACKGROUND

An axle differential transmission is disclosed in EP 1 105 662 B1 which has a transmission housing and a rotating housing which is provided therein and which is mounted in the transmission housing via a first and a second angular contact ball bearing. This rotating housing bears in its interior a differential transmission mechanism which effects a branching of power to the first and second transmission outputs. The rotating housing is driven via a crown gear which is engaged with a drive pinion. The drive pinion is located on a transmission shaft which in turn is mounted in the transmission housing via angular contact ball bearings.

A double-row angular contact ball bearing is disclosed in DE 10 2009 057 192 A1. According to this publication, it is proposed to dimension the balls of the ball-cage assembly, which is smaller in terms of diameter, to be smaller than the balls of the axially adjacent ball-cage assembly which is larger in terms of diameter. The angular contact ball bearing is also constructed such that the front faces of the bearing rings on each bearing side are located in a common plane. The centers of the balls which are larger in terms of diameter move on a central track, the diameter thereof being larger than the maximum track diameter of the external raceway encompassing the smaller ball-cage assembly from the outside.

An angular transmission is disclosed in JP 2003-294 032 A1 which comprises a large gear and a bevel gear pinion in engagement therewith. The bevel gear pinion is mounted via a double-row angular contact ball bearing in a transmission housing. Two separate inner bearing rings are provided in the double-row angular contact ball bearing. The two ball-cage assemblies are arranged such that an intermediate space remains between the inner axial end positions of the track spaces of the ball-cage assemblies.

Similarly, a bearing arrangement for a bevel gear pinion is disclosed in EP 2 503 168 A1 which is formed by a double-row angular contact ball bearing. In this conventional bearing arrangement, similar to the prior art according to D3, the two ball-cage assemblies are arranged such that an intermediate space remains between the inner axial end positions of the track spaces of the ball-cage assemblies.

An angular contact ball bearing which has two separate inner bearing rings and which is load-bearing in two directions is disclosed in DE 2449194 C2. Also in this case the two ball-cage assemblies are arranged such that an intermediate space remains between the inner axial end positions of the track spaces of the ball-cage assemblies.

A wheel hub bearing is disclosed in FR 2 888 625 A1 in which a bell portion of a homokinetic shaft joint is formed integrally with the wheel hub. The wheel hub is mounted in a hub carrier via a double-row angular contact ball bearing arrangement. The ball-cage assemblies provided therein are arranged, as already disclosed in the aforementioned publications D3, D4 and D5, such that an intermediate space remains between the inner axial end positions of the track spaces of the ball-cage assemblies.

A double-row angular contact ball bearing is disclosed in WO 85/03 749 A1 in which either the balls of the two axially adjacent ball-cage assemblies have the same ball diameter or the balls of the ball-cage assembly which is smaller in terms of diameter have a larger ball diameter than the balls of the other remaining ball-cage assembly.

A double-row angular contact ball bearing for a pinion shaft is disclosed in DE 10 2008 024 316. The angular contact ball bearing is designed such that the balls of each ball-cage assembly are arranged axially spaced apart from one another to such an extent that the axial end positions of the track spaces of the ball-cage assemblies do not overlap.

A wheel bearing arrangement is disclosed in WO 2011/062 175 A1 in which a wheel hub is mounted via two opposingly arranged angular contact ball bearings. The balls of the respective angular contact ball bearing are guided in a cage unit, which guides both the balls of the ball-cage assembly which is smaller in terms of diameter and the balls of the ball-cage assembly which is larger in terms of diameter, in each angular contact ball bearing. The raceways and the balls are designed such that the balls of the two adjacent ball-cage assemblies alternately pass into the intermediate spaces between the balls of the respective ball-cage assembly.

In transmission systems, in particular in axle drives or transfer cases, assembly concepts are known in which rolling bearings which are initially apportioned to specific transmission components are inserted thereon or therein and only completed when the subassemblies are combined together to form the respective bearing. This concept makes it possible to produce bearing seat zones on the corresponding transmission housings as whole bearing seat zones and optionally to produce high levels of stiffness of the housings due to the small assembly openings.

SUMMARY

An object of the present disclosure is to disclose solutions by which it is possible to provide transmission units with components which are mounted therein by multi-row angular contact ball bearings and which provide advantages in terms of production technology and assembly technology.

A transmission unit is provided, in particular a transfer case unit, in the form of an axle differential transmission in which the mounting of the corresponding transmission member, in particular the pinion shaft and/or the rotating housing in the transmission housing, is effected by a double-row angular contact ball bearing which is characterized by a high axial and radial load-bearing capacity and is able to be produced with reduced material consumption. Additionally, the required load-bearing capacity may be implemented by this angular contact ball bearing, with an axial and radial constructional space requirement which is reduced as a whole. Features according to the present disclosure also results in greater stiffness relative to the structural-mechanical coupling of the raceway pairs on the respective bearing ring and a more advantageous distribution of the bearing forces guided via the balls in a wide axial force range, whereby advantageously the service lives of the raceways are matched to one another with greater statistical probability across a wide load spectrum.

According to a particularly preferred embodiment of the present disclosure, the bearing seat is designed such that it surrounds the outer bearing ring in an axially undivided manner. This bearing seat may be produced by a material-removing machining process using a track-controlled tool. The bearing seat may also be produced by removing material in the transmission housing using a special drilling tool. Moreover, it is also possible to produce the bearing seat during the course of turning machining, during the course of which the transmission housing rotates relative to a blade carrier.

According to a further feature of the present disclosure, the angular contact ball bearing is initially assembled by the outer bearing ring thereof being inserted into the bearing seat and then a subassembly provided with the inner bearing ring and the two ball-cage assemblies being inserted therein. These features are suitable, in particular, for the assembly of the rotating housing of an axle differential transmission or even the pinion shaft of such a transmission according to the so-called pivoted-in concept. By the construction according to the present disclosure of the angular contact ball bearing, a saving of constructional space is able to be implemented, this assembly concept being simplified thereby, and additionally a larger spatial mobility of the components to be pivoted-in results, since the bearing only requires an alignment of the components to be pivoted-in with the bearing axis shortly before reaching its final joined state.

In the angular contact ball bearing according to the present disclosure, the balls of the two rows may be reliably held by the respective cage on the inner bearing ring so that the risk of a ball falling out is reduced relative to conventional designs.

The transmission housing may also be configured such that at least one of the bearing seats provided by this transmission housing is produced as an axially divided bearing seat. The construction of the angular contact ball bearing according to the present disclosure provides a high load-bearing capacity even when used in an axially divided bearing seat and also makes it possible to reduce the diameter of the bearing seat relative to hitherto known designs. This results in greater stiffness of the bearing seat in the case of an axially divided transmission housing.

According to a particularly preferred embodiment of the present disclosure, the angular contact ball bearing is preferably designed such that the diameter of the first central track of the first balls is smaller than the diameter of the second central track of the second balls. In this layout, therefore, the balls are preferably configured such that the balls have different diameters. In this case the diameters of the first balls are preferably smaller than the diameters of the second balls. The diameter of the smaller balls in this case preferably ranges from 0.75 to 0.95 times the diameter of the large balls.

According to a further feature of the present disclosure, the angular contact ball bearing according to the present disclosure is preferably designed such that the smallest track radius (inner apex radius) of the first inner rolling element raceway is smaller than the smallest track radius (inner apex radius) of the second inner rolling element raceway. Moreover, the smallest track radius of the second inner rolling element raceway is preferably smaller than the radius of the first central track of the first balls.

The axial spacing of the balls may also be adapted such that this spacing is smaller than the arithmetic mean of a small ball diameter and a large ball diameter. The spacing may also be smaller than the diameter of the smaller balls. These features are suitable, in particular, for bearing designs in which the difference in diameter of the balls is relatively small.

The rolling element raceways are preferably designed such that the spacing of a point of intersection of a vertical reference line with the bearing axis from an adjacent front plane of the inner bearing ring is smaller than half of the diameter of the second balls, wherein this vertical reference line is a straight line which in a bearing axial section centrally divides the line segment between the ball centers and is located perpendicular to this line segment. According to a further feature of the present disclosure, this point of intersection of the vertical reference line with the bearing axis is preferably still located axially inside the bearing, i.e. in the axial intermediate region which extends between the front faces of the inner bearing ring.

The balls of the first set are preferably guided in a first cage unit. This cage unit may advantageously be designed as a pocket cage or snap cage which has a continuous annular projection which extends on a side of the angular contact ball bearing remote from the balls of the second set. The balls of the second set are also preferably guided in a second cage unit. This cage unit may in turn advantageously be designed as a pocket cage or snap cage which has a continuous annular projection which extends on a side of the angular contact ball bearing remote from the balls of the first set. At least one of the cages or both cages may also be designed as pocket cages which are provided with the balls radially from the inside and optionally by temporary resilient widening may be placed together with their ball packing on the inner bearing ring.

The second cage and the second balls guided therein may be held until the completion of the bearing assembly by the first cage and the balls guided therein on the inner bearing ring may be held until the outer bearing ring is located on the two ball-cage assemblies. These features may be implemented in a particularly advantageous manner by a slight shoulder (so-called S3 shoulder) being formed at least on the first raceway, which has the effect that the first balls may briefly spring out radially when pushed on and may only be withdrawn axially from the inner bearing ring by radial widening of the cage. According to a particular feature of the present disclosure, a slight shoulder is also formed on the second raceway which prevents an axial migration of the balls of the second ball-cage assembly, in particular by the temporary radial holding action of the second cage and after the assembly of the bearing by the action of the outer bearing ring. This central shoulder of the second rolling element raceway (so-called S4 shoulder) makes it possible to produce the track spaces of the balls of the two ball-cage assemblies as closely axially adjacent to one another as possible since, due to the central shoulder (S4-shoulder) which is axially centered, the balls of the second ball-cage assembly are also hindered from colliding with the balls of the first ball-cage assembly when, for example due to a temporarily absent axial bearing pretensioning, the inner bearing ring is axially relieved of load and migrates relative to the outer bearing ring counter to the direction of support of the bearing.

The first inner rolling element raceway is preferably designed such that it forms a groove profile in axial section. This groove profile thus encompasses a region with a minimal raceway diameter and raceway zones with a greater raceway diameter protruding in axial section from both sides at this region. The first balls of the first set are thus axially guided in the first inner rolling element raceway groove. A corresponding groove-like design may also be advantageously implemented in the second inner rolling element raceway.

As set forth above, the double-row angular contact ball bearing according to the present disclosure is preferably designed such that the axial spacing between the individual rows is smaller than the largest installed rolling element diameter. The bearing rings may be designed such that ratios of the bearing outer diameter to the bearing internal diameter may be achieved which are less than 2.26, in particular less than or equal to 2.15. Moreover, the bearing according to the present disclosure may be produced at a ratio of the overall bearing axial length to the bearing height (0.5×Da−Di) which is less than 1.46, in particular less than or equal to 1.38.

The balls are preferably guided in N-profile cages which are open on one side, wherein these cages in turn are preferably installed such that their open sides face one another, i.e. face toward the inner axial region of the bearing. As a result, the capture of lubricant is further assisted.

The ratio of the jaw width of the cages to the nominal diameter of the balls assigned to the respective cage preferably ranges from 0.6-0.8 times the ball diameter, and preferably ranges from 0.6 to 0.68 times. In comparison with closed N-profile cages, therefore, less axial constructional space is required since as in so-called snap cages the inner projection is dispensed with. In those snap cages, the jaw width is generally sufficiently large that the last ball may be snapped in from the axial direction when the cage assembly is filled, and thus fewer balls are inserted per row and the balls may also become more easily lost, for example, in a typical pivoted-in assembly for these bearings. The pockets of the cages which are preferably used are thus preferably designed such that rolling bodies may only be assembled from one direction (radially from inside and/or radially from outside) since the jaw width is preferably very small. By the typical N-profile rolling element retention, a loss of the rolling bodies in the assembled state is prevented.

Moreover, preferably the radial height H of the apex point of the larger outer ball raceway of the outer ring is located above the apex point of the smaller outer ball raceway by an amount which is equal to or greater than 0.4 times the value of the large ball diameter and additionally smaller than 0.8 times the value of the nominal diameter of the large balls.

Features according to the present disclosure results in significant improvements with regard to the bearing weight and the overall bearing size relative to the prior art. The bearing according to the present disclosure is thus also characterized, in particular, by a greater power density. Features according to the present disclosure also results in an improved distribution of the load which is removed from each bearing row and a length of the service lives of the two bearing rows being substantially similar to one another.

Due to the greater power density, a cost saving is able to be implemented by a material saving. In addition, the bearing may be produced with reduced processing costs, since the surfaces to be machined are smaller and the component weights reduced.

The bearing according to the present disclosure is characterized by a greater power density. Preferably, it has a novel cage design. It permits a saving of weight and material without reducing the bearing performance (i.e. without impairing the service life and functional reliability).

By means of features according to the present disclosure the bearing row spacing is reduced such that it is able to adopt values which are equal to or less than the diameter of the larger rolling bodies installed in the bearing.

As already mentioned above, the bearing according to the present disclosure may be implemented by a 3-shoulder design or even by a 4-shoulder design (i.e. on the inner bearing ring the first raceway is configured as a groove (3S design) or additionally the second raceway is configured as a groove (4S design), wherein the adjacent shoulder heights are thus preferably significantly lower than the respective axially supporting main shoulder.

At least one of the ball-cage assembly rows may be guided in a cage which is open on one side, in particular an N-profile cage described in more detail below. The term shoulder design is understood to mean in this case that the corresponding ball raceway has an apex point and the raceway rises again in the direction of the ball, forming a shoulder.

Advantageously, a ball-cage assembly holding function may be implemented on the bearing according to the present disclosure, in particular at least on the smaller bearing row. With the use of the four shoulder design on the inner bearing ring, a ball-cage assembly holding function may be achieved for both ball rows.

The proposed cage design according to the present disclosure ensures a high ball density and easy assembly with an effective ball-cage assembly holding function on the inner ring. The cage design may be implemented as a cage design with external retention, wherein the external retention in this case is preferably adapted to the raceway superelevation of the inner ring.

The cage used for the respective rolling element row is preferably designed such that the cage edge thereof provides a surface on the front face, the dimensions thereof being adapted such that a throughflow of oil which is reduced but still sufficient is achieved through the bearing, so that oil churning losses on the bearing are reduced. According to a further feature of the present disclosure, the pressure angles of the two bearing rows are adapted such that these angles are substantially equal. These pressure angles may also be different, and according to a particular feature of the present disclosure they preferably range from 25° to 40°.

In the bearing according to the present disclosure as set forth above, the pitch circle diameters (diameters of those circular tracks on which the centers of the balls move) of the two ball rows are preferably different. The ball diameters of the two ball rows are equal or preferably different, wherein in the case of different ball diameters preferably the ball with the smaller diameter is used even in the case of the ball row with the ball central track having a smaller diameter.

The number of balls is preferably adapted such that a maximum ball provision for each bearing row is achieved according to the formulation: ((TK−DM*Pi)/(WK−DM+ 1.3)); wherein the result here is rounded down to a whole number, TK−DM=pitch circle diameter, Pi=3.14159; WK−DM=rolling element diameter (diameter in mm).

According to a further particular feature of the present disclosure, the axial annular front surfaces of the bearing rings are designed such that they have projection zones for ensuring a smaller but more accurate connecting surface for add-on elements. Consequently this results in a reduction in the grinding effort during a lateral grinding process.

The bearing according to the present disclosure may be designed according to a further particular feature of the present disclosure such that the outer ring is able to be freely disassembled and is positioned without any fixing on the two ball rows. In this case preferably a 4S-design is implemented on the inner bearing ring, i.e. the balls of the two ball rows run in grooves of this inner bearing ring. The cages in this case are preferably designed such that these cages hold the balls radially on the grooves of the inner bearing ring.

The bearing according to the present disclosure is suitable, in particular, for producing so-called shaft bearings which are designed to permit a rigid bearing of a shaft structure with as little friction as possible. The bearing according to the present disclosure may be used, in particular, in passenger motor vehicle axle drives, in front-transverse transmissions as a differential bearing and in angular transmissions for bearing the pinion and crown gear. This bearing is also suitable as a substitution bearing for bearing points, where hitherto tapered roller bearings were used. A further large field of use of the bearing according to the present disclosure is in industrial applications. It is also suitable for cardan shafts in the two-wheeled vehicle field and as bearings for agricultural machines, pumps, compressors and off-road vehicles.

The bearing according to the present disclosure is a double-row angular contact ball bearing which is also denoted as a so-called tandem angular contact ball bearing. The novel tandem angular contact ball bearing (tandem ball bearing TBB) according to the present disclosure has a small axial overall depth and a small radial overall height and with a comparable load-bearing capacity requires less constructional space than conventional tandem angular contact ball bearings.

The reduction in overall axial height in comparison with conventional designs is implemented, in particular, by using two novel plastics cages which in the described manner permit the two ball rows of the bearing to be pushed together tightly, in particular to an extent in which the axial spacing of the ball centers measured in the direction of a bearing axis of the bearing is equal to or smaller than the diameter of the largest installed ball.

By the novel cage design, in each case without the second cage edge, the ball rows may be arranged relative to one another with minimum spacing. As a result, the entire bearing may be of narrower construction in the axial direction.

Pushing together the two bearing rows results in positive side effects. Thus the bearing distributes the loads to be supported more effectively between the two ball rows by the improved and more uniform bearing row-load distribution in the bearing according to the present disclosure, and the bearing according to the present disclosure in comparison with hitherto known designs provides improved service lives and as a result may in turn be "downsized". The bearing frictional torque is also reduced by downsizing (fewer rolling bodies, smaller pitch circle diameter). By the narrower design savings are made relative to the bearing ring material and the bearing costs are reduced.

The bearing is preferably designed as set forth above such that the axial spacing between the individual rows is smaller than the largest installed rolling element diameter. The axial spacing may also be slightly larger than the largest installed rolling element diameter. Thus the axial spacing may also be adapted such that this axial spacing is smaller than the maximum ball diameter plus the difference in the balls, if rolling bodies which differ in terms of their diameter are used for the two ball rows.

In the bearing according to the present disclosure preferably open N-profile cages are used, said open N-profile cages saving axial constructional space in contrast to conventional N-profile cages and permitting greater mounting capacities in contrast to conventional snap cages. The pockets of the N-profile cages are designed such that rolling bodies may only be assembled from one direction (from inside and/or from outside). By the typical N-profile rolling element retention, a loss of the rolling bodies in the assembled state (i.e. both ball-cage assemblies with an individual separate cage) is prevented.

According to a further feature of the present disclosure, the object set forth in the introduction is also achieved according to the present disclosure by a transmission unit having an angular contact ball bearing, comprising:

an inner bearing ring, a first inner rolling element raceway formed in the outer peripheral region of the inner bearing ring, a second inner rolling element raceway axially offset to the first inner rolling element raceway and formed in the outer peripheral region of the inner bearing ring, an outer bearing ring with a first outer rolling element raceway which is formed in an inner peripheral region of the outer bearing ring, a second outer rolling element raceway axially offset to the first outer rolling element raceway and formed in the outer bearing ring, a first set comprising first balls which are accommodated in a first track space extending between the first inner rolling element raceway and a first outer rolling element raceway, and a second set comprising second balls which are accommodated in a second track space extending between the second inner rolling element raceway and the second outer rolling element raceway, wherein the centers of the first balls move on a first central track with a small diameter about a bearing axis and the centers of the second balls move on a second central track with a greater diameter about the bearing axis and the axial spacing of the two central tracks measured in the direction of this bearing axis and the diameters of the central tracks are adapted to one another such that, in a bearing axial section containing the bearing axis, a cone casing line defined by the centers of the first and second balls encloses with the bearing axis an angle which is greater than or equal to the arc tangent $((RB2-RB1)/(k \times BD2))$. Where $RB2$=radius of the central track of the second balls; $RB1$=radius of the central track of the first balls; $k$=coefficient of compression; $BD2$=diameter of the second balls, $BD1$=diameter of the first balls. Wherein the coefficient of compression k is less than 1.22, in particular less than the ball diameter ratio ($BD2/BD1$) or less than the value "1".

BRIEF DESCRIPTION OF THE FIGURES

Further details and features of the present disclosure are disclosed from the following description in connection with the drawings, in which.

DETAILED DESCRIPTION OF THE FIGURES

Figure 1A:
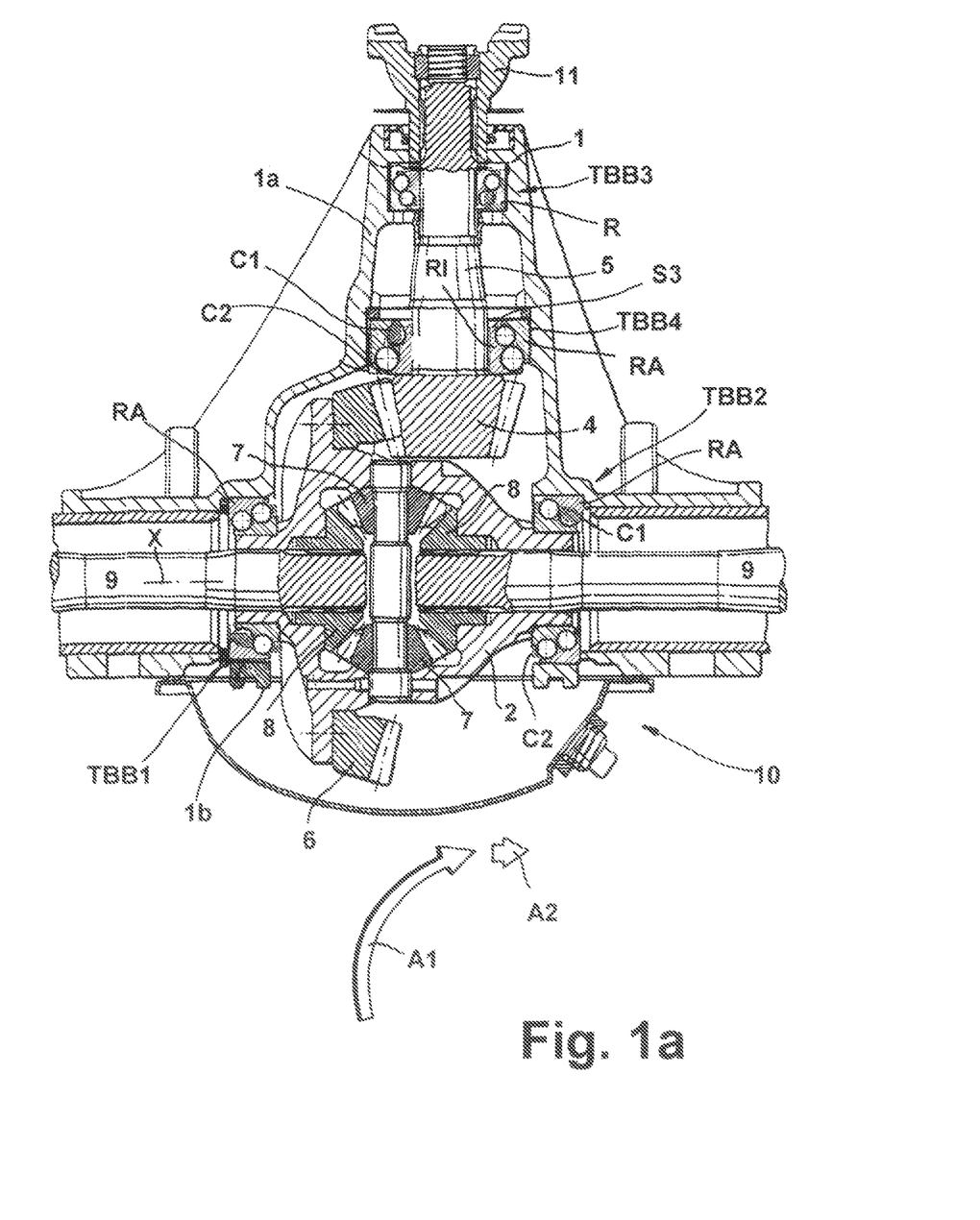
FIG. 1*a* shows a simplified sectional view for illustrating the construction of a transmission unit according to the present disclosure with a differential gear and a pinion shaft which in each case are mounted in a transmission housing via angular contact ball bearings according to the present disclosure which are constructed to be extremely short in the axial direction.

The motor vehicle transfer case shown in FIG. 1a has a housing 1 in which a differential transmission 2 is mounted via two respective double-row angular contact ball bearings TBB1, TBB2. A bevel gear pinion 4 of a bevel gear pinion shaft 5 drives a crown gear 6 which in turn sets in motion the differential transmission 2. The differential transmission 2 is connected to one respective axle shaft 9 via differential gears 7 and output gears 8 which drive gearwheels, not shown. The bevel gear pinion shaft 5 is also held in the housing 1 via two further double-row angular contact ball bearings TBB3, TBB4 which are axially spaced apart from one another and which are moved toward one another by a threaded part 11 in the axial direction, i.e. placed under pretensioning.

During assembly of this transfer case initially the outer bearing rings RA of the small pinion shaft bearing and the large pinion shaft bearing TBB3 and TBB4 and the right-hand differential bearing TBB2, in this view, are inserted into the transmission housing 1 with a light push fit. Subsequently, the inner bearing ring RI of the large pinion shaft bearing TBB4 is placed on the pinion shaft 5. Now both cages C1, C2 which are provided with their balls radially from the inside are pushed onto this inner bearing ring RI of the pinion shaft bearing TBB4. At the same time the first cage snaps shut when passing over the first shoulder S3 of the inner bearing ring RI and also holds the second cage C2 together with the balls located therein on the inner bearing ring RI. Now the pinion shaft, provided with the inner bearing ring RI and the two ball-cage assemblies of the bearing TBB4, is pushed via the housing opening 10 from the inside into the housing shaft 1a. Subsequently, the inner bearing ring RI of the smaller pinion shaft bearing TBB3 is provided with both ball-cage assemblies and pushed into the housing shaft 1a from the side opposing the opening 10 until the two ball-cage assemblies are located in the corresponding outer bearing ring RA. Now the threaded part 11 is positioned and the axial pretensioning of the bearings TBB3, TBB4 which now bear the pinion shaft 5 in the housing 1 is adjusted thereby.

In the next step the two inner bearing rings RI of the double-row angular contact ball bearings according to the present disclosure TBB1, TBB2 are pressed onto the corresponding journal portions of the rotating housing of the differential transmission 2. The ball-cage assemblies held in their respective cages C1, C2 are prelubricated and snapped onto the inner rings RI of the two angular contact ball bearings TBB1, TBB2. Additionally, the outer bearing ring RA is now positioned on the left-hand bearing TBB1, in this view, which has been thus equipped. The differential transmission 2 thus equipped is pivoted into the outer bearing ring RA of the bearing TBB2 as indicated by the tracks A1, A2. The construction of the bearing TBB2 permits in this case a curved track A1 which permits the outer bearing ring RA of the left-hand bearing TBB1 to reach a sufficiently coaxial position relative to the bearing axis X, so that then the inner bearing ring RI of the right-hand bearing TBB2, in the view, then engages with the outer bearing ring RA of the bearing TBB2 along a short substantially linear track A2 along the bearing axis X, together with its two ball-cage assemblies. At the same time, the crown gear 6 engages with the pinion 4. Now the already completed bearing TBB1 may be supported axially by a further ring and fixed in the transmission housing 1 by a bearing seat bracket 1b.

In the exemplary embodiment shown in FIG. 1a, the bearings TBB1, TBB2, TBB3 and TBB4 in each case are designed as double-row angular contact ball bearings with a construction according to the present disclosure, described in more detail below in connection with FIG. 1b. However, the present disclosure is not limited to such an application, in particular the bearing TBB3, which is loaded to a relatively small degree in the transmission system shown, may also be designed to have a different construction. The possibility of a pivoted-in assembly of the differential transmission 2 may also be achieved in a different manner, and thus for example instead of the bearing seat bracket 1b an arrangement may be provided which permits the outer bearing ring RA of the left-hand bearing TBB1, in this view, to be retrospectively pushed on and permits a subsequent axial support thereof.

Figure 1B:
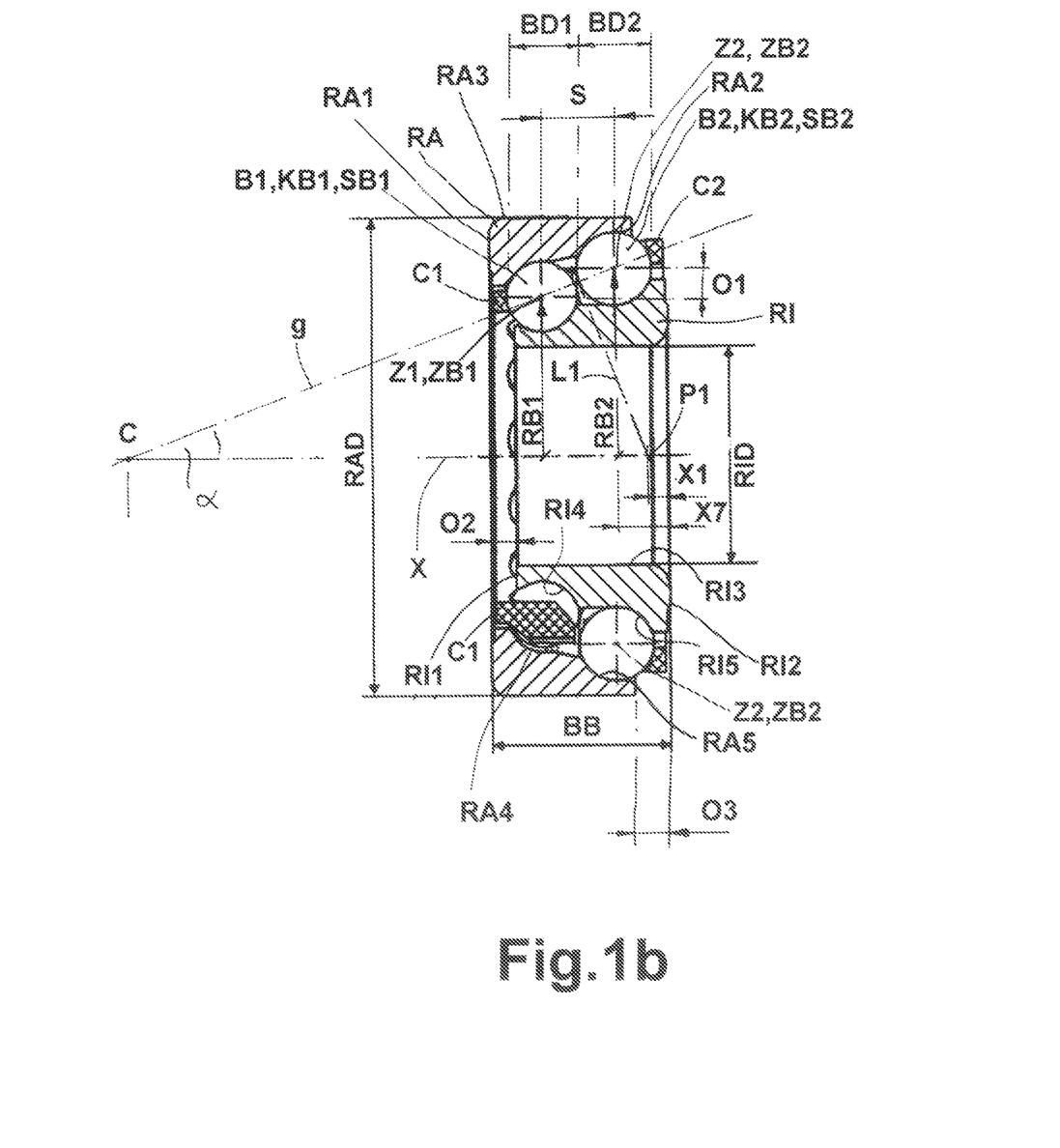
FIG. 1*b* shows a schematic view for illustrating the construction of a double-row angular contact ball bearing according to the present disclosure.

The view according to FIG. 1b now shows an exemplary embodiment of a preferred embodiment of an angular contact ball bearing according to the present disclosure with an inner bearing ring RI, with a first inner ring front face RI1, a second inner ring front face RI2 and a cylindrical inner ring seat surface RI3.

The angular contact ball bearing further comprises a first inner rolling element raceway RI4 which is formed in an outer peripheral region of the inner bearing ring RI and which is curved in a concave manner in axial section and a second inner rolling element raceway RI5 axially offset to the first inner rolling element raceway RI4 and formed in the outer peripheral region of the inner bearing ring RI, said second inner rolling element raceway also being curved in a concave manner in axial section.

The bearing comprises an outer bearing ring RA with a first outer ring front surface RA1, a second outer ring front surface RA2 and a cylindrical outer ring seat surface RA3. A first outer rolling element raceway RA4 is formed in an inner peripheral region of the outer bearing ring RA and is curved in a concave manner in axial section, and additionally a second outer rolling element raceway RA5 is also formed on the outer bearing ring RA, said second outer rolling element raceway being axially offset to the first outer rolling element raceway RA4 and also being curved in a concave manner in axial section.

The bearing comprises a first ball-cage assembly KB1 comprising first balls B1 which are accommodated in a first track space SB1 extending between the first inner rolling element raceway RI4 and the first outer rolling element raceway RA4. The bearing further comprises a first cage unit C1 for guiding the first balls B1 of the first ball-cage assembly KB1 and a second cage C2 for guiding the second balls B2 of a second ball-cage assembly KB2 which are accommodated in a second track space SB2 extending between the second inner rolling element raceway RI5 and the second outer rolling element raceway RA5.

In the double-row angular contact ball bearing according to the present disclosure, the centers ZB1 of the first balls B1 run on a first central track Z1 about a bearing axis X. The centers Z2 of the second balls B2 circulate on a second central track ZB2 about the bearing axis X. The central tracks ZB1, ZB2 have different radii RB1, RB2.

The first and second cage units C1, C2 are produced as separate cages C1, C2 and may have different angular speeds from one another with a relative rotation of the inner bearing ring RI relative to the outer bearing ring RA. Whilst the track spaces SB1, SB2 are closely adjacent, however, these track spaces RB1, RB2 do not intersect one another but only overlap regarding their inner axial end positions without the balls B1, B2 passing into the respective other ball track space.

The spacing of the second central track ZB2 from the outer ring seat surface RA3 of the outer bearing ring RA is smaller than the spacing of the second central track ZB2 from the inner ring seat surface RI3 of the inner bearing ring RI. Additionally, the axial spacing S of the two central tracks ZB1, ZB2 measured in the direction of the bearing axis X is smaller than a maximum diameter BD2 of the balls B2 of one of the ball-cage assemblies, in this case KB2.

In the embodiment shown here of the bearing according to the present disclosure, the balls B1, B2 have different diameters BD1, BD2. The spacing S of the central tracks ZB1, ZB2 measured in the direction of the bearing axis X is smaller than the diameter BD2 of the larger balls B2. In particular, the spacing here is smaller than the arithmetic mean of the ball diameters BD1, BD2.

The bearing according to the present disclosure shown here is additionally designed such that the radius RB1 of the first central track ZB1 of the first balls B1 is smaller than the radius RB2 of the central track ZB2 of the second balls B2. The diameters BD1 of the first balls B1 of the first ball-cage assembly KB1 are smaller than the diameters BD2 of the second balls B2 of the second ball-cage assembly KB2.

The smallest track radius of the first inner rolling element raceway RI4 is smaller than the smallest track radius of the second inner rolling element raceway RI5. Additionally, the smallest track radius of the second inner rolling element raceway RI5 is smaller than the radius RB1 of the first central track ZB1 of the first balls B1.

According to a particular feature of the present disclosure, the double-row angular contact ball bearing according to the present disclosure is designed such that the spacing X1 of a point of intersection P1 of a vertical reference line L1 with the bearing axis X from an adjacent front plane of the inner bearing ring RI defined by the front surface RI2 is smaller than half of the diameter BD2 of the second balls B2, wherein this vertical reference line L1 is a straight line which in a bearing axial section centrally divides the line segment between the ball centers Z1, Z2 and stands perpendicular to this line segment.

This line segment encompassing the ball centers Z1, Z2 extends on a straight line g. This straight line g intersects the bearing axis X at a point C. The spacing of this point C from a front plane which is defined by the front surface RA1 of the outer bearing ring RA ranges from 1.7 to 2.4 times the total axial width BB of the bearing, in particular is 2.1.

The angle α enclosed between the straight line g and the bearing axis X is an angle which is greater than or equal to the arc tangent $((RB2-RB1)/(k \times BD2))$. Where RB2=radius of the central track of the second balls; RB1=radius of the central track of the first balls; k=coefficient of compression; BD2=diameter of the second balls. Wherein the coefficient of compression k is less than 1.22, in particular less than (BD2/BD1) or less than the value "1".

The ball-cage assembly KB1 of the first balls B1 in this case has a number of balls which differs from the number of balls of the ball-cage assembly KB2 of the second balls B2. In the bearing shown the first ball-cage assembly 13 comprises 13 balls with a diameter BD1 of 12.7 mm and the second ball-cage assembly KB2 comprises 14 balls with a diameter BD2 of 13.5 mm. The total diameter RAD of the outer bearing ring here is 88 mm. The internal diameter RID of the inner bearing ring RI is 40.98 mm. The width BB is 32.5 mm here. The first inner front surface RI1 is offset axially relative to the first front surface RA1 of the outer bearing ring, axially toward the bearing center region. The amount of offset O2 is preferably greater than the offset X1 of the point of intersection P1 relative to the front plane which is defined by the front surface RI2. The front surface RI2 is also axially offset relative to the front surface RA2 of the outer bearing ring, so that it protrudes by an amount O3 from the plane defined by the outer ring front surface RA2 in a direction facing away from the axial bearing center. This amount O3 preferably corresponds to half of the diameter BD2 of the second balls and is greater than the amount of offset O2.

Figure 2:
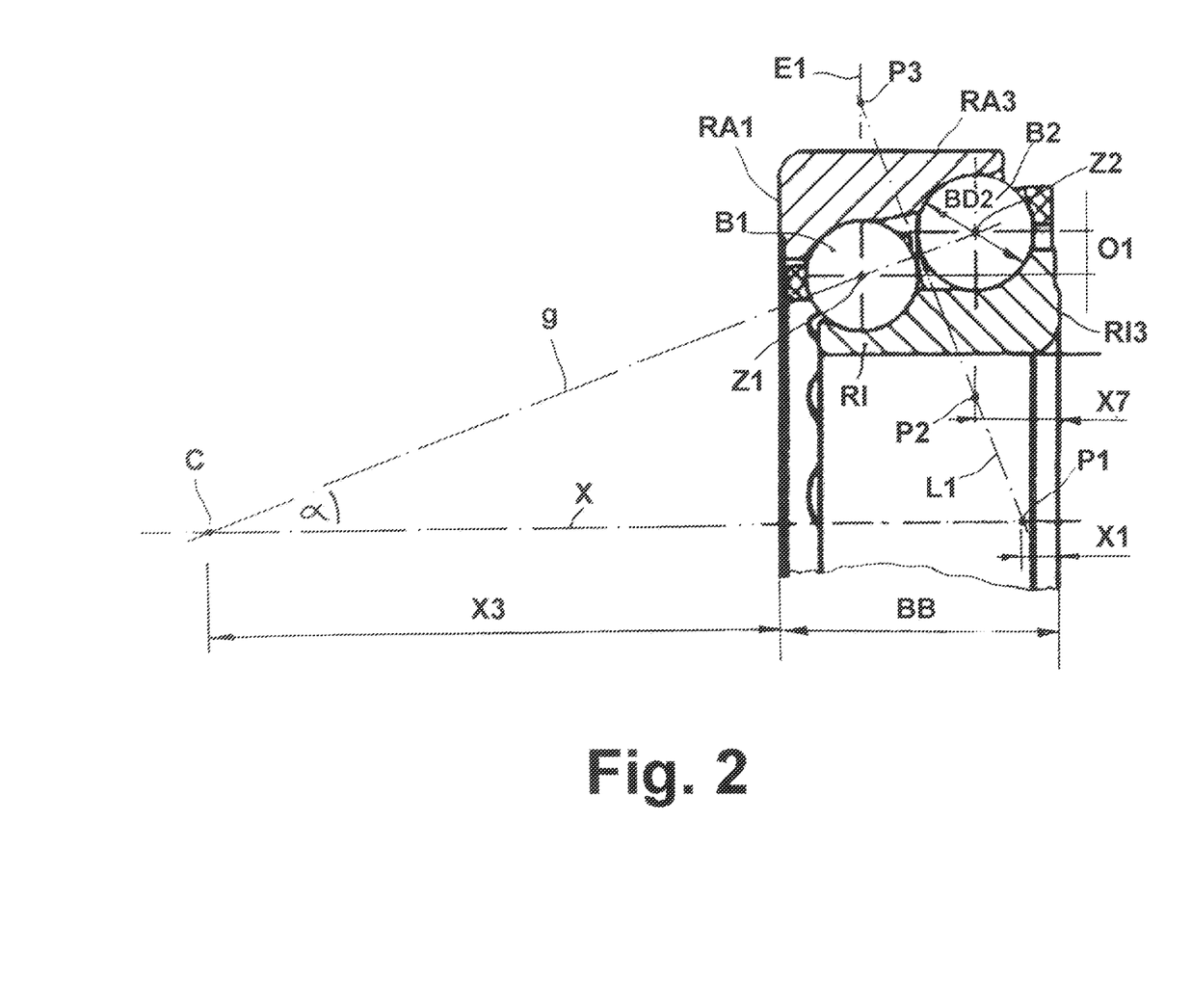
FIG. 2 shows a further schematic view for illustrating the construction of a double-row angular contact ball bearing according to the present disclosure with regard to the position of the ball track centers and the arrangement achieved thereby of the two ball-cage assemblies.

The view according to FIG. 2 further illustrates, in the form of a detailed view, the construction of the double-row angular contact ball bearing according to the present disclosure. As already set forth above, the spacing X1 of a point of intersection P1 of a vertical reference line L1 with the bearing axis X from an adjacent front plane of the inner bearing ring RI defined by the front surface RI2 is smaller than half of the diameter BD2 of the second balls B2, wherein this vertical reference line L1 is a straight line which in the present bearing axial section, containing the bearing axis X, centrally divides the line segment between the ball centers Z1, Z2, and is located perpendicular to this line segment.

This line segment extends on the straight line g. This straight line g intersects the bearing axis X at a point C. The spacing X3 of this point C from a front plane, which is defined by the front surface RA1 of the outer bearing ring RA, ranges from 1.7 to 2.4 times the total axial width BB of the bearing, in particular is 2.1. The axial spacing X7 of the second central track ZB2 from the second front surface RI2 of the inner bearing ring RI is smaller than the diameter BD2 of the second balls B2.

For the angle α enclosed between the straight line g and the bearing axis x it applies that this angle α is equal to the arc tangent $(O1/(k \times BD2))$. Where O1=(RB2−RB1); RB2=radius of the central track of the second balls; RB1=radius of the central track of the first balls; k=coefficient of compression; BD2=diameter of the second balls. Wherein the coefficient of compression k is less than 1.22, in particular less than (BD2/BD1) or less than the value "1".

The point of intersection P3 of the vertical reference line with a radial plane E1 defined by the peripheral track ZB1 of the ball centers Z1 of the first balls B1 is located at a radial level outside the outer peripheral surface RA3 of the outer bearing ring RA. A point of intersection P2 of the vertical reference line L1 with a peripheral plane of the second ball center Z2 is located inside the bore encompassed by the inner seat surface RI3 of the inner bearing ring RI, in particular at a radial level relative to the bearing axis which ranges from 0.7 to 0.8 times, in particular 0.75 times, the inner radius (0.5×RID) of the inner bearing ring RI.

Figure 3:
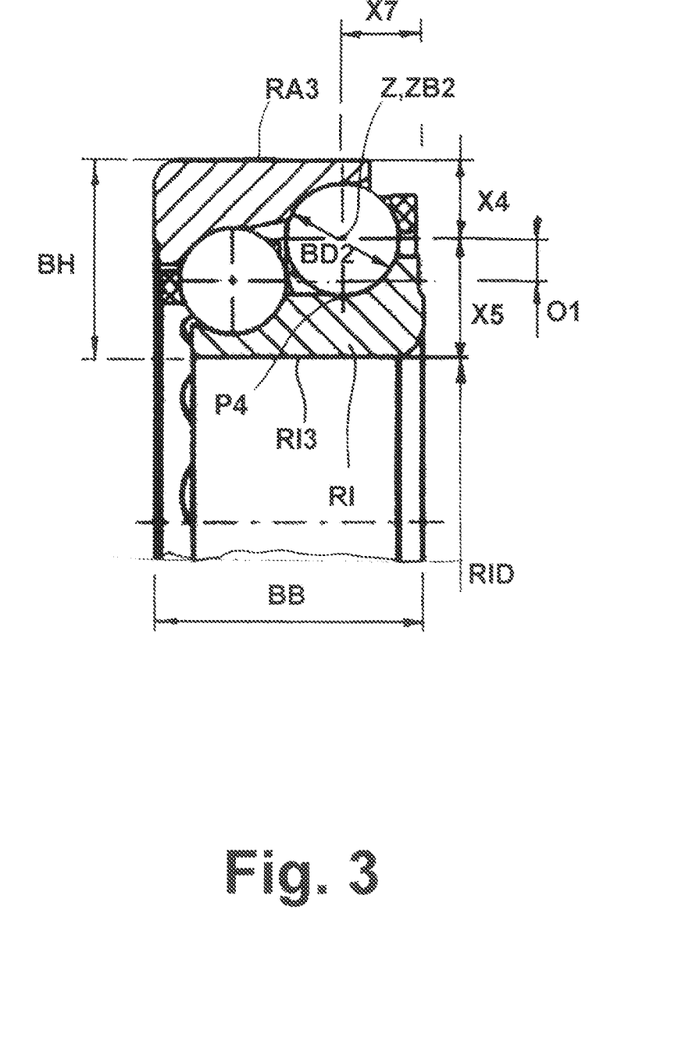
FIG. 3 shows a schematic view for describing the construction of a double-row angular contact ball bearing according to the present disclosure with regard to further design features of the bearing rings and the positions of the ball track centers.

The view according to FIG. 3 serves for illustrating and describing the proportions of the bearing width BB relative to the bearing height BH. In the exemplary embodiment shown here, the ratio of the bearing width BB to the bearing height BH ranges from 1.2 to 1.5, in particular is 1.36. The ratio of the internal diameter RID to the overall bearing width BB ranges from 1.0 to 1.4, in particular is 1.21, as shown in practice here. The radial spacing X4 of the second central track ZB2 of the centers Z2 of the second balls B2 relative to the outer peripheral surface RA3 is smaller than the spacing X5 of the second central track ZB2 from the inner peripheral surface RI3 of the inner bearing ring RI. The radial offset O1, i.e. the difference in track radius between the track radius of the second central track ZB2 and the track radius of the first central track ZB1, is smaller than half of the diameter BD2 of the second balls B2. Moreover, the spacing X5 of the second central track ZB2 from the inner peripheral surface RI3 of the inner bearing ring RI preferably ranges from 0.8 to 1.2 times the diameter BD2 of the second balls B2, in particular is 1.05. Thus the radial thickness of the inner bearing ring RI in the region of the inner track apex point P4 substantially corresponds to half of the diameter BD2 of the second balls. The axial spacing X7 of the second central track ZB2 from the second front surface RI2 of the inner bearing ring RI is smaller than the diameter BD2 of the second balls B2.

Figure 4:
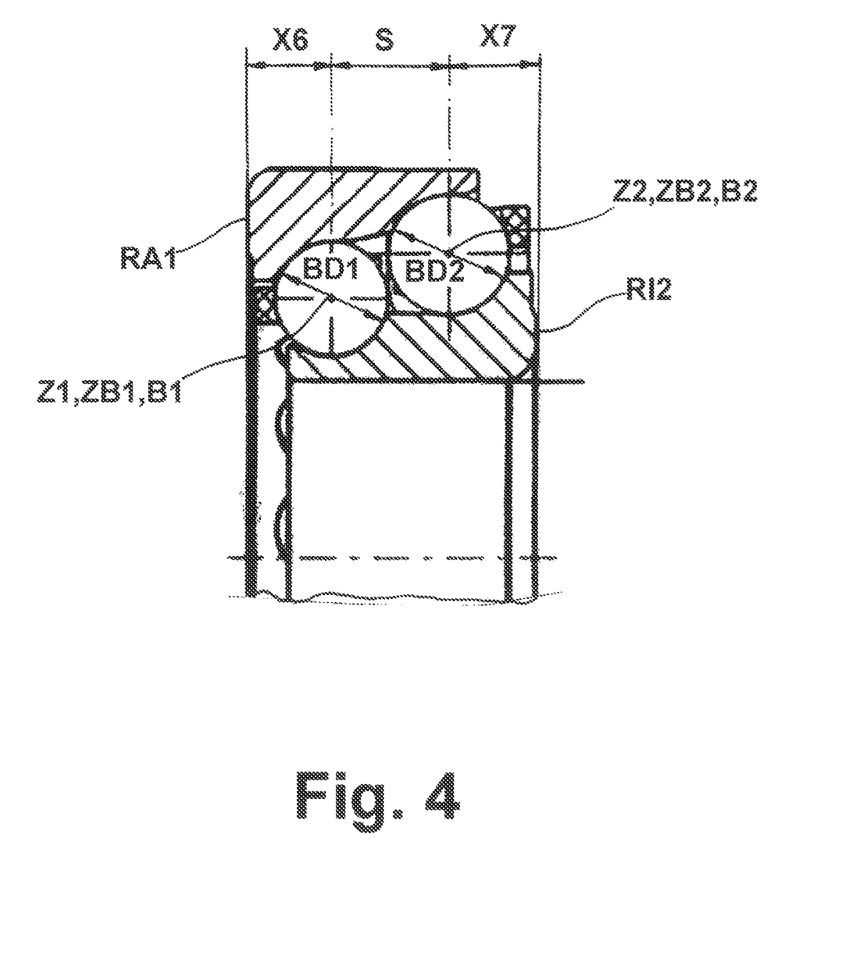
FIG. 4 shows a schematic view for describing the construction of a double-row angular contact ball bearing according to the present disclosure regarding the axial positions of the ball track centers.

The view according to FIG. 4 serves for illustrating and describing the axial positions of the central tracks ZB1, ZB2 and the axial spacing S between these central tracks ZB1, ZB2. In the preferred embodiment of the double-row angular contact ball bearing according to the present disclosure shown here, the axial spacing S of the central tracks ZB1, ZB2 is adapted to the diameter BD2 of the second balls B2, such that this spacing S is less than or equal to the diameter BD2. The axial spacing X6 of the first central track ZB1 from the first front surface RA1 of the outer bearing ring and the axial spacing X7 of the second central track ZB2 from the second front surface RI2 of the inner bearing ring RI are adapted such that the following applies: (BD1/X6)=q (BD2/X7); wherein q preferably ranges from 0.85 to 1.2, in particular is 1, or corresponds to the ratio of the large diameter BD2 to the small diameter BD1.

Figure 5:
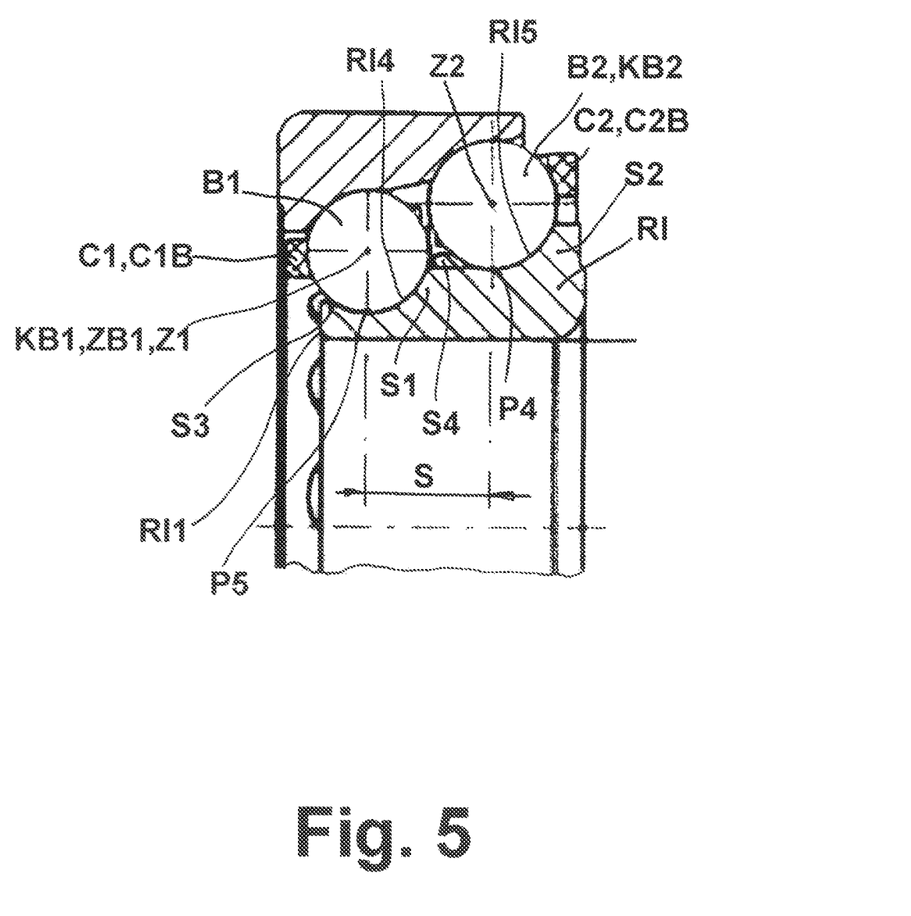
FIG. 5 shows a schematic view for describing the construction of a double-row angular contact ball bearing according to the present disclosure with regard to the configuration of shoulders on the inner bearing ring.

The view according to FIG. 5 serves for illustrating and describing the design of the inner bearing ring RI in the so-called 3-shoulder design or—as illustrated here additionally in the 4-shoulder design. As may be identified, both raceways RI4, RI5 are designed as raceway grooves which are concave in axial section. The raceway RI4 of the first balls B1, as already shown in the above-described views, comprises in its region adjacent to the first inner ring front face RI1, a flat shoulder S3 which effects an axial holding action of the balls B1, as soon as said balls are inserted in the first cage C1 and pushed onto the inner bearing ring RI by temporary resilient deformation of the first cage C1.

A further shoulder S4 is configured in a region of the inner bearing ring RI located axially between the centers Z1, Z2 of the balls B1, B2, said shoulder rising outwardly in the radial direction over the radial level of the track apex point P4. The rising of the shoulder S4 may be adapted such that this shoulder protrudes at the height of the first central track ZB1 of the first ball or is located just below this radial level. This shoulder may be configured to be rounded in the outlet region of the wall RI4 coming into contact with the second ball B2, so that this wall then smoothly transitions into the track RI4 on its flank facing the first ball B1.

By means of features according to the present disclosure, the spacing S of the ball-cage assembly centers Z1, Z2, i.e. of the bearing rows, is reduced such that this spacing may have values which are equal to or less than the diameter of the largest rolling element installed in the bearing B1, B2.

The bearing according to the present disclosure, as already mentioned above, may be produced by a 3-shoulder or even a 4-shoulder design (i.e. on the inner bearing ring the first raceway RI4 is configured as a groove (3S design) or additionally the second raceway RI5 is configured as a groove (4-shoulder design)), wherein the adjacent shoulder heights are thus preferably significantly lower than the respectively axially supporting main shoulder S1, S2.

At least one of the ball-cage assembly rows KB1, KB2 may be guided in a cage C1, C2 which is open on one side, in particular an N-profile cage described in more detail below. The term shoulder design is understood to mean here that the corresponding ball raceway RI4, RI5 has an apex point P5, P4 and the raceway rises again in the direction of the ball B1, B2, forming a shoulder.

Advantageously a ball-cage assembly holding function may be implemented on the bearing according to the present disclosure, in particular at least on the smaller bearing row KB1. When using the four-shoulder design on the inner bearing ring RI, a ball-cage assembly holding function may be achieved for both ball rows KB1, KB2.

The proposed design according to the present disclosure of the cages C1, C2 ensures a high ball density and a possibilty of simple assembly, with an effective ball-cage assembly holding function on the inner ring RI. The cages C1, C2 may be implemented as cages with external retention, wherein the external retention in this case is preferably adapted to the raceway superelevation of the inner ring RI. The cage C1, C2 used for the respective rolling element row KB1, KB2 is preferably designed such that the cage edge CB1, CB2 thereof provides a surface on the front face, the dimensions thereof being adapted such that a throughflow of oil which is reduced but still sufficient is achieved through the bearing, so that oil churning losses on the bearing are reduced. According to a further feature of the present disclosure, the pressure angles of the two bearing rows KB1, KB2 are adapted such that these angles are substantially equal. These pressure angles may also be different, and according to a particular feature of the present disclosure preferably they range from 25° to 40°. In the bearing according to the present disclosure as set forth above, preferably the pitch circle diameters (diameters of those circular tracks ZB1, ZB2 on which the centers Z1, Z2 of the balls B1, B2 move) of the two ball rows KB1, KB2 are different. The ball diameters BD1, BD2 (see FIG. 1) of the two ball rows KB1, KB2 are equal or preferably different, as shown here, wherein in the case of different ball diameters BD1, BD2 preferably the ball B1 with the smaller diameter BD1 is used even in the case of the ball row KB1 with a smaller track radius RB1 of the ball central track ZB1.

The number of balls is preferably adapted such that a maximum ball provision for each bearing row KB1, KB2 is achieved according to the formulation: ((TK−DM*Pi)/(WK−DM)); wherein the result here is rounded down to a whole number, TK−DM=pitch circle diameter (2× central track radius RB1 and/or RB2), Pi=3.14159; WK−DM=rolling element diameter (BD1, BD2).

Figure 6A:
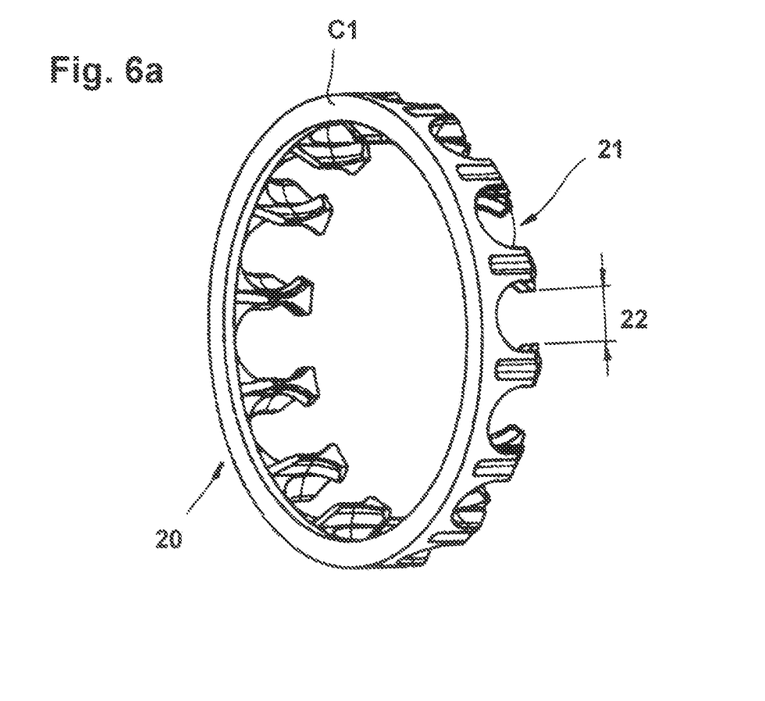
FIGS. 6a, 6b and 6c show views for illustrating the construction of a cage for an angular contact ball bearing according to the present disclosure.
Figure 6B:
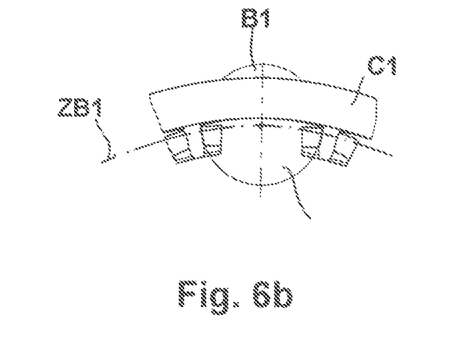
Figure 6C:
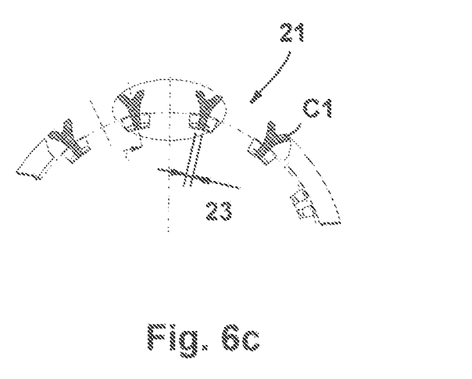

The views according to FIGS. 6a, 6b and 6c further illustrate the construction of a cage C1 used in the bearing unit according to the present disclosure. This cage C1 has on its side region, remote from the bearing interior in the assembled position, a continuous annular edge 20 which is adapted such that this annular edge forms a defined gap in the direction of the outer bearing ring and thus only runs on the outer bearing ring in exceptional cases. The cage C1 is produced from a plastics material. The pockets 21 provided for receiving the balls B1 are designed such that these pockets generate a radial and axial holding action for the balls accommodated therein so that the cage C1 may be provided with balls B1 and these balls B1 then may be held sufficiently captively in the cage C1 for further assembly and held by said cage on the inner bearing ring.

As shown in FIG. 6b the cage C1 encompasses the balls B1 at the radial level of the ball central track ZB1 or in the region of a hemisphere located radially above the ball central track ZB1.

The pockets 21 are configured to be open on their side remote from the annular edge 20. The ratio of the jaw width 22 of the cages to the nominal diameter of the balls assigned to the respective cage preferably ranges from 0.6-0.8 times the ball diameter, preferably ranges from 0.6 to 0.68 times. In comparison with conventional closed N-profile cages, less axial constructional space is required thereby, since as in so-called snap cages the inner projection is dispensed with. In those snap cages the jaw width is generally sufficiently large that when the cage assembly is filled, the last ball may be snapped in from the axial direction and thus fewer balls may be used per row and, for example, become more easily lost in the case of a pivoted-in assembly which is typical for these bearings.

The view according to FIG. 6c shows the cross section of the N-profile cage C1 according to FIG. 6a in a radial plane in which the minimum projection thickness is produced. The pockets 21 of the cages C1, C2 which are preferably used according to the present disclosure are preferably designed such that the balls B1 may be assembled from only one direction (here radially from the inside). The minimum projection thickness 23 measured in the peripheral direction preferably ranges from 10 to 18% of the ball diameter. Preferably, the ball diameter, the number of balls and the central track diameter are adapted such that with a maximum number of balls, or a maximum number of balls which is reduced by "1", corresponding minimum projection thicknesses are produced which stabilize the cage sufficiently and provide sufficient wear reserve over the anticipated service life of the bearing.

What is claimed is:

1. A transmission unit comprising:
   a transmission housing;
   a transmission element rotatably accommodated in the transmission housing;
   a bearing seat;
   an angular contact ball bearing accommodated in the bearing seat for mounting the transmission element, the angular contact ball bearing comprising:
      an inner bearing ring with a first inner ring front face, a second inner ring front face and a cylindrical inner ring seat surface;
      a first inner rolling element raceway formed in an outer peripheral region of the inner bearing ring and curved in a concave manner in an axial section;
      a second inner rolling element raceway axially offset to the first inner rolling element raceway and formed in the outer peripheral region of the inner bearing ring, the second inner rolling element raceway also being curved in a concave manner in an axial section;
      an outer bearing ring with a first outer ring front face, a second outer ring front face and a cylindrical outer ring seat surface;
      a first outer rolling element raceway formed in an inner peripheral region of the outer bearing ring and curved in a concave manner in an axial section;
      a second outer rolling element raceway axially offset to the first outer rolling element raceway and formed in the outer bearing ring, the second outer rolling element raceway being curved in a concave manner in an axial section;
      a first ball-cage assembly comprising first spherical balls accommodated in a first track space extending between the first inner rolling element raceway and the first outer rolling element raceway;
      a first cage unit for guiding the first spherical balls of the first ball-cage assembly;
      a second ball-cage assembly comprising second spherical balls accommodated in a second track space extending between the second inner rolling element raceway and the second outer rolling element raceway; and
      a second cage unit for guiding the second spherical balls of the second ball-cage assembly,
   centers of the first spherical balls arranged to move on a first central track about a bearing axis and centers of the second spherical balls arranged to move on a second central track about the bearing axis,
   the first central track and the second central track having different track radii,
   the track radius of the first central track of the first spherical balls being smaller than the track radius of the second central track of the second spherical balls,
   the first and second cage units being movable at different angular speeds from one another with a relative rotation of the inner bearing ring relative to the outer bearing ring,
   a spacing of the second central track from the outer ring seat surface of the outer bearing ring being smaller than a spacing of the second central track from the inner ring seat surface of the inner bearing ring,
   an axial spacing of the first and second two central tracks measured in a direction of the bearing axis being smaller than a maximum diameter of the first spherical balls or a maximum diameter of the second spherical balls,
   the maximum diameter of the first spherical balls being smaller than the maximum diameter of the second spherical balls,
   a difference between the track radius of the second central track and the track radius of the first central track being smaller than a half of the maximum diameter of the second spherical balls,
   a spacing of the second central track from an inner peripheral surface of the inner bearing ring ranges from 0.8 to 1.2 times the maximum diameter of the second spherical balls,
   wherein at least one of:
      the axial spacing of the first and second two central tracks is smaller than an arithmetic mean of the maximum diameters of the first and second spherical balls, and
      the axial spacing of the first and second two central tracks is smaller than the maximum diameter of the first spherical balls.

2. The transmission unit as claimed in claim 1, wherein the axial spacing of the first and second two central tracks is smaller than the arithmetic mean of the maximum diameters of the first and second spherical balls.

3. The transmission unit as claimed in claim 1, wherein the axial spacing of the first and second two central tracks is smaller than the maximum diameter of the first spherical balls.

4. The transmission unit as claimed in claim 1, wherein a spacing of a first point of intersection of a vertical reference line with the bearing axis from an adjacent front plane of the inner bearing ring is smaller than half of the maximum diameter of the second spherical balls, the vertical reference line being a straight line which in a bearing axial section centrally divides a line segment between the centers of the first spherical balls and the centers of the second spherical balls and is located perpendicular to the line segment.

5. The transmission unit as claimed in claim 4, wherein the line segment extends on a straight line and intersects the bearing axis at a second point of intersection, a spacing of the second point of intersection from a front plane defined by the first outer ring front face ranges from 1.7 to 2.4 times a total axial width of the angular contact ball bearing.

6. The transmission unit as claimed in claim 4, wherein the first inner ring front face is offset axially relative to the first outer ring front face toward the first point of intersection by an amount that is greater than the spacing of the first point of intersection of the vertical reference line with the bearing axis from the adjacent front plane of the inner bearing ring.

7. The transmission unit as claimed in claim 4 wherein a third point of intersection of the vertical reference line with a radial plane defined by the centers of the first spherical balls is located at a radial level outside the cylindrical outer ring seat surface.

8. The transmission unit as claimed in claim 4 wherein a fourth point of intersection of the vertical reference line with a radial plane of the centers of the second spherical balls is located inside a bore encompassed by the cylindrical inner ring seat surface.

9. The transmission unit as claimed in claim 8 wherein the fourth point of intersection is at a radial level relative to the bearing axis which ranges from 0.7 to 0.8 times an inner radius of the inner bearing ring.

10. The transmission unit as claimed in claim 1, wherein the first and second cage units are configured as open cages in their side regions facing one another.

11. The transmission unit as claimed in claim 1 wherein an amount of the first spherical balls in the first ball-cage assembly is greater than an amount of the second spherical balls in the second ball-cage assembly.

12. The transmission unit as claimed in claim 1 wherein an axial spacing of the second central track from the second inner ring front face is smaller than the maximum diameter of the second spherical balls.

13. The transmission unit as claimed in claim 1 wherein the transmission element is a bevel gear pinion shaft or a differential transmission.

14. A transmission unit comprising:
a transmission housing;
a transmission element rotatably accommodated in the transmission housing;
a bearing seat;
an angular contact ball bearing accommodated in the bearing seat for mounting the transmission element, the angular contact ball bearing comprising:
an inner bearing ring with a first inner ring front face, a second inner ring front face and a cylindrical inner ring seat surface;
a first inner rolling element raceway formed in an outer peripheral region of the inner bearing ring and curved in a concave manner in an axial section;
a second inner rolling element raceway axially offset to the first inner rolling element raceway and formed in the outer peripheral region of the inner bearing ring, the second inner rolling element raceway also being curved in a concave manner in an axial section;
an outer bearing ring with a first outer ring front face, a second outer ring front face and a cylindrical outer ring seat surface;
a first outer rolling element raceway formed in an inner peripheral region of the outer bearing ring and curved in a concave manner in an axial section;
a second outer rolling element raceway axially offset to the first outer rolling element raceway and formed in the outer bearing ring, the second outer rolling element raceway being curved in a concave manner in an axial section;
a first ball-cage assembly comprising first spherical balls accommodated in a first track space extending between the first inner rolling element raceway and the first outer rolling element raceway;
a first cage unit for guiding the first spherical balls of the first ball-cage assembly;
a second ball-cage assembly comprising second spherical balls accommodated in a second track space extending between the second inner rolling element raceway and the second outer rolling element raceway; and
a second cage unit for guiding the second spherical balls of the second ball-cage assembly,
centers of the first spherical balls arranged to move on a first central track about a bearing axis and centers of the second spherical balls arranged to move on a second central track about the bearing axis,
the first central track and the second central track having different track radii,
the track radius of the first central track of the first spherical balls being smaller than the track radius of the second central track of the second spherical balls,
the first and second cage units being movable at different angular speeds from one another with a relative rotation of the inner bearing ring relative to the outer bearing ring,
a spacing of the second central track from the outer ring seat surface of the outer bearing ring being smaller than a spacing of the second central track from the inner ring seat surface of the inner bearing ring,
an axial spacing of the first and second two central tracks measured in a direction of the bearing axis being smaller than a maximum diameter of the first spherical balls or a maximum diameter of the second spherical balls,
the maximum diameter of the first spherical balls being smaller than the maximum diameter of the second spherical balls,
a difference between the track radius of the second central track and the track radius of the first central track being smaller than a half of the maximum diameter of the second spherical balls,
a spacing of the second central track from an inner peripheral surface of the inner bearing ring ranges from 0.8 to 1.2 times the maximum diameter of the second spherical balls,
wherein a spacing of a first point of intersection of a vertical reference line with the bearing axis from an adjacent front plane of the inner bearing ring is smaller than half of the maximum diameter of the second spherical balls, the vertical reference line being a straight line which in a bearing axial section centrally divides a line segment between the centers of the first spherical balls and the centers of the second spherical balls and is located perpendicular to the line segment, wherein at least one of:

the line segment extends on a straight line and intersects the bearing axis at a second point of intersection, a spacing of the second point of intersection from a front plane defined by the first outer ring front face ranges from 1.7 to 2.4 times a total axial width of the angular contact ball bearing;

a third point of intersection of the vertical reference line with a radial plane defined by the centers of the first spherical balls is located at a radial level outside the cylindrical outer ring seat surface; and a fourth point of intersection of the vertical reference line with a radial plane of the centers of the second spherical balls is located inside a bore encompassed by the cylindrical inner ring seat surface.

15. The transmission unit as claimed in claim 14, wherein the line segment extends on the straight line and intersects the bearing axis at the second point of intersection, the spacing of the second point of intersection from the front plane defined by the first outer ring front face ranges from 1.7 to 2.4 times the total axial width of the angular contact ball bearing.

16. The transmission unit as claimed in claim 14, wherein the third point of intersection of the vertical reference line with the radial plane defined by the centers of the first spherical balls is located at the radial level outside the cylindrical outer ring seat surface.

17. The transmission unit as claimed in claim 14, wherein the fourth point of intersection of the vertical reference line with the radial plane of the centers of the second spherical balls is located inside the bore encompassed by the cylindrical inner ring seat surface.

18. A transmission unit comprising:
a transmission housing;
a transmission element rotatably accommodated in the transmission housing;
a bearing seat;
an angular contact ball bearing accommodated in the bearing seat for mounting the transmission element, the angular contact ball bearing comprising:
an inner bearing ring with a first inner ring front face, a second inner ring front face and a cylindrical inner ring seat surface;
a first inner rolling element raceway formed in an outer peripheral region of the inner bearing ring and curved in a concave manner in an axial section;
a second inner rolling element raceway axially offset to the first inner rolling element raceway and formed in the outer peripheral region of the inner bearing ring, the second inner rolling element raceway also being curved in a concave manner in an axial section;
an outer bearing ring with a first outer ring front face, a second outer ring front face and a cylindrical outer ring seat surface;
a first outer rolling element raceway formed in an inner peripheral region of the outer bearing ring and curved in a concave manner in an axial section;
a second outer rolling element raceway axially offset to the first outer rolling element raceway and formed in the outer bearing ring, the second outer rolling element raceway being curved in a concave manner in an axial section;
a first ball-cage assembly comprising first spherical balls accommodated in a first track space extending between the first inner rolling element raceway and the first outer rolling element raceway;
a first cage unit for guiding the first spherical balls of the first ball-cage assembly;
a second ball-cage assembly comprising second spherical balls accommodated in a second track space extending between the second inner rolling element raceway and the second outer rolling element raceway; and
a second cage unit for guiding the second spherical balls of the second ball-cage assembly,
centers of the first spherical balls arranged to move on a first central track about a bearing axis and centers of the second spherical balls arranged to move on a second central track about the bearing axis,
the first central track and the second central track having different track radii,
the track radius of the first central track of the first spherical balls being smaller than the track radius of the second central track of the second spherical balls,
the first and second cage units being movable at different angular speeds from one another with a relative rotation of the inner bearing ring relative to the outer bearing ring,
a spacing of the second central track from the outer ring seat surface of the outer bearing ring being smaller than a spacing of the second central track from the inner ring seat surface of the inner bearing ring,
an axial spacing of the first and second two central tracks measured in a direction of the bearing axis being smaller than a maximum diameter of the first spherical balls or a maximum diameter of the second spherical balls,
the maximum diameter of the first spherical balls being smaller than the maximum diameter of the second spherical balls,
a difference between the track radius of the second central track and the track radius of the first central track being smaller than a half of the maximum diameter of the second spherical balls,
a spacing of the second central track from an inner peripheral surface of the inner bearing ring ranges from 0.8 to 1.2 times the maximum diameter of the second spherical balls,
wherein an axial spacing of the second central track from the second inner ring front face is smaller than the maximum diameter of the second spherical balls.

* * * * *